United States Patent

Watt et al.

[15] 3,649,859
[45] Mar. 14, 1972

[54] SENSOR WITH CONSTANT AIRGAP

[72] Inventors: John A. Watt, Ann Arbor, Mich.; Hugh E. Riordan, Wycoff, N.J.

[73] Assignee: Kelsey-Hayes Company, Romulus, Mich.

[22] Filed: June 15, 1970

[21] Appl. No.: 48,868

Related U.S. Application Data

[63] Continuation of Ser. No. 741,735, July 1, 1968, abandoned.

[52] U.S. Cl. ............................310/67 R, 310/75 R, 310/156, 310/168, 310/268
[51] Int. Cl. ..................................................H02k 7/18
[58] Field of Search .......................310/268, 261–269, 310/154–156, 67, 67.1, 74, 75, 103, 106, 109, 209, 164, 168, 181

[56] References Cited

UNITED STATES PATENTS

| 2,658,157 | 11/1953 | Brouwer | 310/156 |
| 2,499,036 | 2/1950 | Plantet | 310/103 X |
| 2,956,187 | 10/1960 | Wood | 310/75 |
| 3,482,129 | 12/1969 | Riordan | 310/168 X |
| 3,179,831 | 4/1965 | Moressee et al. | 310/268 |
| 3,323,793 | 6/1967 | Brown | 310/156 X |
| 2,735,028 | 2/1956 | Brouwer | 310/67.1 |

FOREIGN PATENTS OR APPLICATIONS

| 726,055 | 3/1955 | Great Britain | 310/67.1 |

OTHER PUBLICATIONS

IBM Technical Disclosure Bulletin, W. R. Gafford, Self-Aligning Bearing, Vol. 11, No. 3, 8/68.

Primary Examiner—J. D. Miller
Assistant Examiner—B. A. Reynolds
Attorney—Harness, Dickey & Pierce

[57] ABSTRACT

An electrical sensor for sensing rotational speed between a pair of relatively rotatable members with the sensor including a pair of relatively rotatable poles being mounted, such that there will be substantially no change in airgap despite relative radial and axial movement between the relatively rotatable members.

11 Claims, 5 Drawing Figures

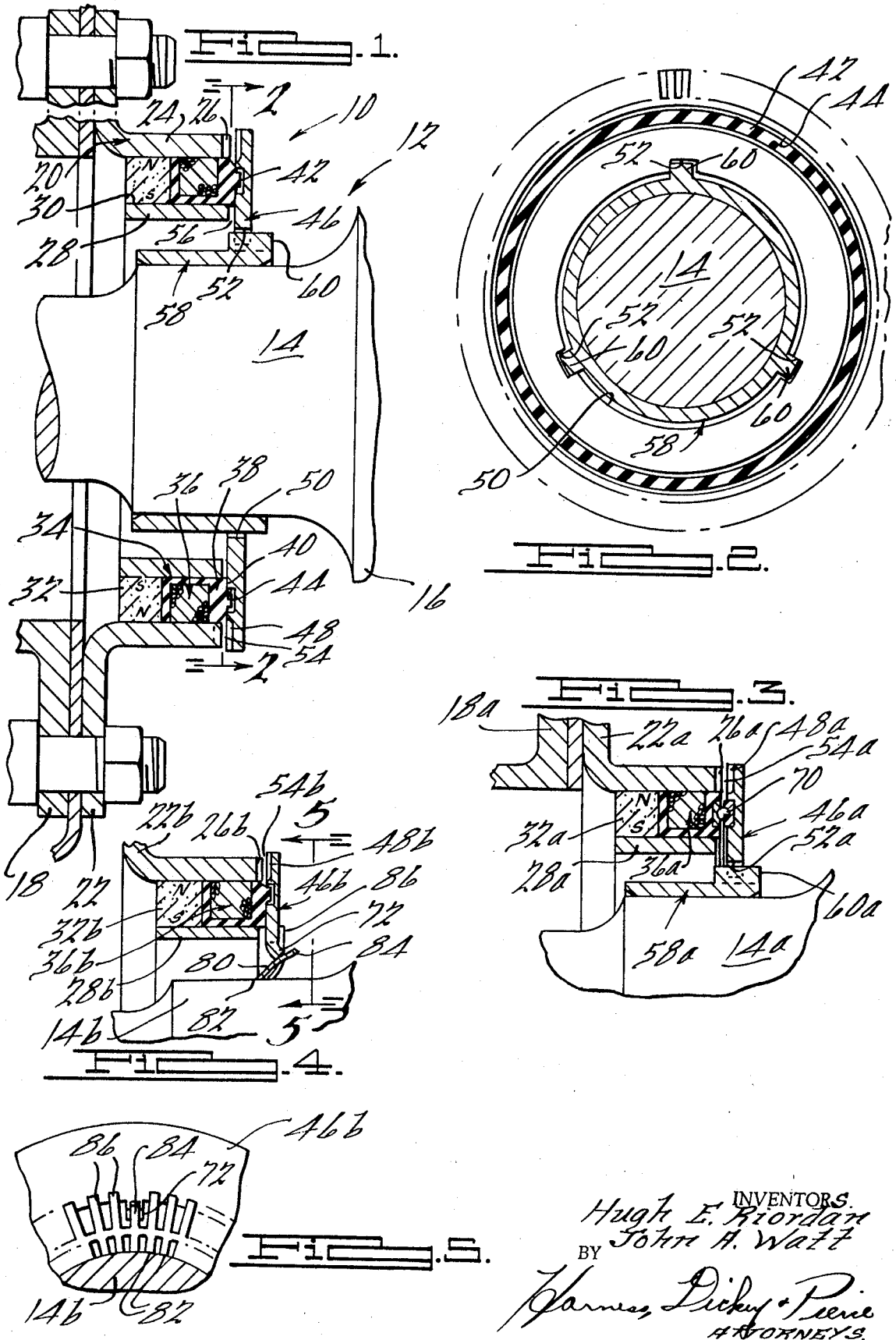

SENSOR WITH CONSTANT AIRGAP

This is a continuation of application Ser. No. 741,735, filed on July 1, 1968, now abandoned.

SUMMARY BACKGROUND OF THE INVENTION

The present invention relates to electrical speed sensors.

In sensing the rotational speed at the rear wheels of a vehicle, a desirable location for the sensor is between the axle shaft flange and axle housing of the rear wheel. However, it has been found that under severe load conditions the rear axle shaft undergoes substantial radial deflection relative to the housing. With a sensor construction having a pair of relatively rotatable pole members, one being fixed to the axle housing and the other being fixed to rotate with the axle shaft, it has been found that the extreme radial and/or axial deflections under severe load of the axle shaft cause substantial variation in the airgap between the sensor pole members and in some cases could cause the two members to engage resulting in damage to the sensor. The problem of engagement can be avoided by providing a sufficiently large airgap or spacing between the two sensor pole members such that even under the most extreme load conditions of the axle shaft such engagement would not occur. However, with such a construction a relatively wide airgap would be required reducing the efficiency of the sensor. In the present invention the airgap is maintained at a minimum and the sensor pole member secured to the axle shaft is mounted in a construction such that the pole member mounted to axle shaft will not be moved axially or radially despite relative movement of the axle shaft hence permitting the provision of a desired minimum airgap. Hence a highly efficient construction can be provided.

Therefore, it is an object of the present invention to provide an improved sensor construction for sensing relative rotation between two relatively rotating members.

It is another object of the present invention to provide a new and improved sensor construction of the above-described type in which the sensing rings or poles are secured such that a substantially constant airgap is maintained despite extreme load conditions causing relative radial and/or axial motion between the members whose relative rotational speed is being sensed.

It is another object of the present invention to provide a novel and improved sensor construction for use with the rear axle assembly of a vehicle in which the sensing rings or poles of the sensor are mounted to the axle shaft and axle housing in a manner providing substantially no radial and/or axial relative movement whereby a minimum air gap can be maintained.

Other objects, features, and advantages of the present invention will become apparent from the subsequent description and the appended claims, taken in conjunction with the accompanying drawings, in which FIG. 1 is an elevational view with some parts shown in section and others broken away of a sensor assembly embodying features of the present invention;

FIG. 2 is a sectional view to reduced scale of the sensor assembly of FIG. 1 taken generally along the lines 2—2;

FIG. 3 is a fragmentary view with some parts shown in section of a modified form of sensor assembly;

FIG. 4 is a fragmentary view with some parts shown in section of a different, modified form of sensor assembly; and FIG. 5 is a sectional view taken generally along the lines 5—5 in FIG. 4.

Looking now to the FIGS. 1 and 2 of the drawing, the sensor assembly is generally indicated by the numeral 10 and is shown in assembly relationship with a rear axle assembly 12 which rear axle assembly includes an axle shaft 14 which terminates at its outer end in a flange 16 to which a wheel assembly (not shown) can be mounted. The axle shaft 14 is rotatably mounted within an axle housing assembly 18 to which at least a portion of the sensor assembly 10 is mounted.

The sensor has a stator or fixed pole member 20 which is secured to the axle housing 18 through a radially extending flange 22. The stator 20 has an axially extending annular portion 24 terminating in a plurality of generally uniformly circumferentially disposed, radially extending teeth 26. The axially extending portion 24 along with an annular ring 28 defines an annular cavity 30 in which are located a permanent magnet 32 and a coil assembly 34. The permanent magnet 32 is preferably of an annular ring construction having a polarity as indicated in FIG. 1. The coil assembly 34 also extends annularly within the opening 30 and includes an electrical coil 36 which is wound in a plastic bobbin 38. The bobbin 38 can be constructed of a material having good bearing characteristics such as Teflon for a purpose to be described. The forward face 40 of the bobbin 38 extends beyond the axial extremity of the teeth 26 and also beyond the axial outer extremity of the ring 28 for a purpose to be presently seen. The bobbin 38 is provided with an annular axially extending ring portion 42 which is piloted within an annular groove 44 located in an armature or rotor member 46. The rotor or pole member 46 is generally of a flat washer shape and has a plurality of uniformly circumferentially disposed radially extending teeth 48 which are located in axial confrontation with the teeth 26. The teeth 48 are radially longer than the teeth 26 for purposes to be described. The armature 46 has a central circular opening 50 which is provided with a plurality of radially outwardly extending slots 52. The armature 46 is made of a magnetic material and is held in bearing engagement against the outer face 40 of the bobbin 38 by the magnetic attraction from the field caused by the permanent magnet 32; the projection 42 and groove 44 properly locate the teeth 48 of the armature 46 relative to the teeth 26 of the stator 20. With the assembly as shown and described thus far a first airgap 54 is defined between the teeth 26 and 48 and second airgap 56 is defined between the armature 46 and the ring 28. The armature 46 is rotated by a drive ring 58 which is secured to the axle shaft 14 as by a press fit and hence will rotate therewith. The drive ring 58 has a plurality of radially outwardly extending tabs 60 which are located with a clearance relationship all around, within the grooves 52 in armature 46; thus rotation of the shaft 14 will cause rotation of armature 46 via the drive ring 58 resulting in an induced potential in coil 36 of a frequency indicative of the rotational speed of axle shaft 14. Note that since the material of the bobbin 38 has good bearing characteristics the bearing surface 40 will provide only slight frictional engagement with armature 46.

In the event of radial deflection of the axle shaft 14 relative to the axle housing 18, the relative position between the armature 46 and the stator 20 will be unchanged since the tab 60 will be free to move radially within slot 52 without disturbing the position of the armature 46. Also, with this connection between the drive member 58 and armature 46 relative axial movement between the axle shaft 14 and the axle housing 18 can occur without relative motion occurring between the armature 46 and the stator 20. Thus with the construction shown, relative axial and radial movement between the axle shaft 14 and the axle housing 18 can occur without change in the air gaps 54 and 56; since these airgaps will be maintained at a constant width, they can be provided to be of a minimum whereby the reluctance will be a minimum resulting in an efficient sensor. It can be seen from the construction shown, some, slight radial movement can occur between the armature 46 and the stator 20. However, the teeth 48 on armature 46 are longer than the teeth 26 and hence even with movement of the armature to its extreme positions there will be no change in the effective airgap between the teeth 36 and 48.

A slightly modified form is shown in FIG. 3 in which the interconnection of projection 42 and groove 44 and the sliding bearing with the surface 40 has been eliminated and an annular bearing assembly 70 has been substituted therefor. In FIG. 3 of the drawing, parts similar to corresponding parts in the embodiment of FIGS. 1 and 2 are given the same numeral designations with the addition of the letter "a." In FIGS. 4 and 5 a still different form is shown in which the drive ring 58 has been eliminated and a flexible, resilient connection has been provided between the armature and the stator. In the embodiment of FIGS. 4 and 5 components similar to like components in FIG. 1 have been given similar numeral designations with the addition of the letter "b." Thus the armature 46b is provided with a plurality of axially extending finger portions 72. Drive ring 80 is made of a flexible material having a plurality of radially inwardly extending fingers 82 and 84 at its radially inner surface which will grip the axle shaft 14b such that the rotation of the axle shaft 14b will result in rotation of the flexible drive ring 80. The drive member 80 also has a plurality of radially outwardly extending fingers 86 at its outer periphery. In assembly, the axial projections 72 will engage one of the fingers 86 depressing it radially inwardly as shown whereby the driving action will be provided by two circumferentially, adjacent fingers; since the engagement between the drive member 80 and the armature 46b is by way of fingers 86 any relative axial and radial movement will be accommodated by flexing of the engaging ones of the fingers 84 thereby again maintaining the widths of airgap 54b and 56b constant. Note that radially inner fingers 82 are longer than fingers 84; this provides better gripping and an axially wider support base than if the fingers were of uniform length. Note also that assembly for driving engagement of armature 46b with the drive ring 80 is simplified since no particular circumferential alignment need be maintained (as with the tabs 60 and grooves 52) and any group of outer fingers 86 lining up with finger portions 72 will suffice.

While it will be apparent that the preferred embodiments of the invention disclosed are well calculated to fulfill the objects above stated, it will be appreciated that the invention is susceptible to modification, variation and change without departing from the proper scope of fair meaning of the invention.

What is claimed is:

1. An electrical rotational speed sensor for providing an electrical signal indicative of the rotational speed between a pair of members with one of the members supported for rotation relative to the other, the sensor comprising: a rotor connected to the one of the members for rotation therewith, a stator connected to the other of the members proximate to said rotor, a magnetic path having a preselected airgap between confronting surfaces on said rotor and said stator, and mounting means mounting said rotor and said stator in predetermined positions relative to each other and maintaining said airgap substantially constant through relative movement between the members in the axial and radial directions, said mounting means including drive means supported on the one of the members for rotation therewith and coupling means for rotatably coupling said drive means and said rotor for rotation by the one of the members, said coupling means comprising a radially extending tab located in a radially extending slot with a clearance therebetween in the axial and radial directions for freely accepting relative movement between the members in the axial and radial directions with the position relationship between said rotor and stator being held substantially constant in the direction of said airgap whereby forces generated by said relative movement between said members is not transmitted to said mounting means.

2. The sensor of claim 1 with said mounting means magnetically holding said rotor and stator.

3. The sensor of claim 1 with both said rotor and said stator being supported on a first of the members.

4. The sensor of claim 1 with said rotor being generally in the shape of a washer and having a flat bearing surface, said stator having a flat surface of bearing material and with said mounting means magnetically holding said rotor and stator with said bearing surface engaging said surface of bearing material.

5. The sensor of claim 1 with an antifriction bearing member located between said rotor and said stator and with said mounting means magnetically holding said rotor and said stator together through said antifriction member, said antifriction member extending annularly about the axis of the one member and radially guiding and locating said rotor and said stator relative to each other.

6. The sensor of claim 1 with said confronting surfaces including a first set of circularly disposed teeth and a second set of circularly disposed teeth facing said first set with the teeth of one of said sets being longer than the teeth of the other of said sets whereby the effective airgap will remain substantially the same through slight relative movement between said rotor and said stator in a direction along the length of the teeth.

7. An electrical rotational speed sensor for providing an electrical signal indicative of the rotational speed between a pair of members with one of the members supported for rotation relative to the other, the sensor comprising: a rotor connected to the one of the members for rotation therewith being generally in the shape of a washer and having a flat bearing surface, a stator connected to the other of the members proximate to said rotor having a flat surface of bearing material, a magnetic path having a preselected airgap between confronting surfaces on said rotor and said stator, and mounting means mounting said rotor and said stator in predetermined positions relative to each other and maintaining said airgap substantially constant through relative movement between the members in one of axial and radial directions, with said mounting means magnetically holding said rotor and stator with said bearing surface engaging said surface of bearing material, guide and locating means for radially guiding and locating said stator and rotor and comprising an annular groove on one of said bearing surface and said surface of bearing material and a circularly distributed projection on the other of said bearing surface and said surface of bearing material located in said annular groove, said mounting means including drive means connected with the one member and said rotor providing a clearance therebetween in said one of axial and radial directions for freely accepting relative movement between the members in said one of axial and radial directions with the position relationship between said rotor and stator being held substantially constant in the direction of said airgap whereby forces generated by said relative movement between said members is not transmitted to said mounting means.

8. An electrical rotational speed sensor for providing an electrical signal indicative of the rotational speed between a pair of members with one of the members supported for rotation relative to the other, the sensor comprising: a rotor connected to the one of the members for rotation therewith, a stator connected to the other of the members proximate to said rotor, a magnetic path having a preselected airgap between confronting surfaces on said rotor and said stator, and mounting means mounting said rotor and said stator in predetermined positions relative to each other, said mounting means maintaining said airgap substantially constant through movement of the members both axially and radially, said mounting means including a drive ring supported on the one of the members for rotation therewith and coupling means for rotatably coupling said drive ring and said rotor for rotation of said rotor by the one of the members, said coupling means comprising a radially extending tab located in a radially extending slot, said slot defined by a plurality of generally radially extending, resilient fingers with one of said fingers being bent axially and with said tab generally axially engaging said one of said fingers and being located between two of said fingers on opposite sides of said one of said fingers.

9. The sensor of claim 8 with said drive ring including said fingers which extend radially outwardly and further including a second plurality of radially inwardly extending fingers for gripping the one of the members.

10. The sensor of claim 9 with said confronting surfaces extending radially with teeth on at least one of said surfaces.

11. An electrical rotational speed sensor for providing an electrical signal indicative of the rotational speed between a pair of members with one of the members supported for rotation relative to the other, the sensor comprising: a rotor connected to the one of the members for rotation therewith, a stator connected to the other of the members proximate to said rotor, a magnetic path having a preselected airgap between confronting surfaces on said rotor and said stator, and mounting means mounting said rotor and said stator in predetermined positions relative to each other, said mounting means maintaining said airgap substantially constant through movement of the members both axially and radially, said mounting means including coupling means for rotatably coupling the one of the members and said rotor for rotation of said rotor by the one of the members, said coupling means comprising a radially extending tab located in a radially extending slot, said slot defined by a plurality of generally radially extending, resilient fingers with one of said fingers being bent axially and with said tab generally axially engaging said one of said fingers and being located between two of said fingers on opposite sides of said one of said fingers.

* * * * *